March 5, 1968  O. W. BAGBY  3,371,538
SAMPLER GAUGE
Filed April 1, 1966
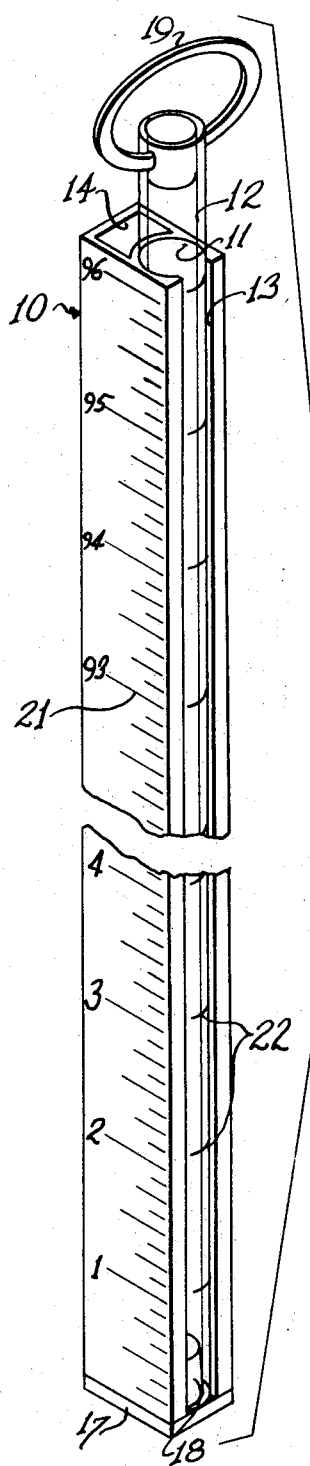
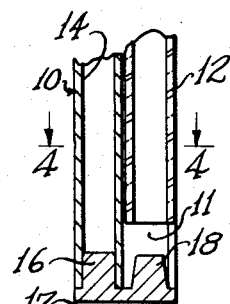
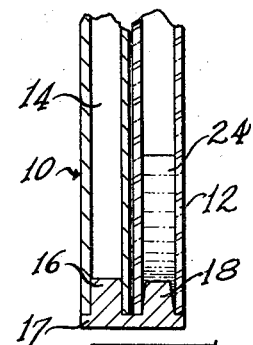
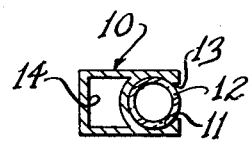
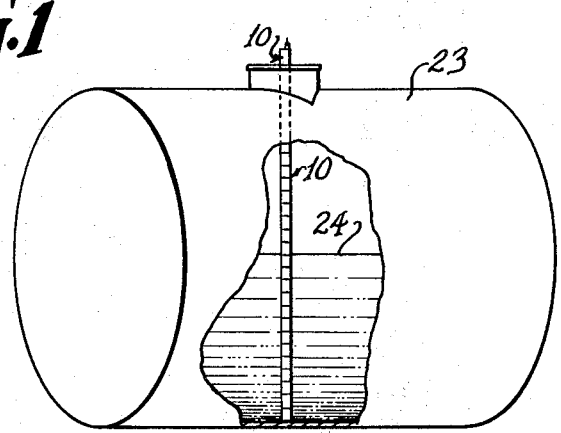
INVENTOR.
Orville W. Bagby
BY Jennings, Carter & Thompson
Attorneys

United States Patent Office 3,371,538
Patented Mar. 5, 1968

3,371,538
SAMPLER GAUGE
Orville W. Bagby, Rte. 2, Box 37,
Pinson, Ala. 35126
Filed Apr. 1, 1966, Ser. No. 539,434
2 Claims. (Cl. 73—425.4)

ABSTRACT OF THE DISCLOSURE

A liquid sampler gauge having an elongated vertical member and tube slidably connected for longitudinal movement relative to each other with the upper ends thereof terminating adjacent each other. A stopper carried by the elongated member closes the lower end of the tube upon relative movement in one direction and opens the lower end of the tube upon relative movement in the opposite direction.

---

This invention relates to a sampler gauge and more particularly to such a gauge that is adapted to be inserted in a container, such as a tank, drum or the like to determine the level of the liquid therein and at the same time indicate whether or not there is a product difference.

An object of my invention is to provide a sampler gauge of the character designated which shall permit liquid in the container to move upwardly into an elongated tubular member as the tubular member is inserted into a container whereby the sample of liquid within the tubular member is substantially identical to liquid in the container, thus indicating whether or not any liquid, such as water, has collected in the bottom of the container and whether or not there are other product differences within the container.

Another object of my invention is to provide a sampler gauge of the character designated which shall include means to close the lower end of the tubular member upon movement of the tubular member relative to an elongated member carrying the same, thus permitting the liquid to flow inwardly of the tubular member as the tubular member moves downwardly through the liquid rather than having to wait until the tubular member reaches the bottom of the container.

A further object of my invention is to provide a sampler gauge of the character designated which shall be simple of construction, economical of manufacture and one which is easily operated to obtain accurate indications as to the liquid level and condition of the liquid in the container.

Heretofore in the art to which my invention relates, difficulties have been encountered in obtaining a representative sample of the liquid in a container due to the fact that the liquid moves into the sampler gauge tube only after the device has reached the bottom of the container or, on the other hand, liquid flows into the top of a tube-like member. In either case, the liquid flowing into the gauge all comes from either the top or the bottom layer of liquid within the container.

In accordance with my invention, the tubular member moves downwardly through the liquid in the container whereby there is a minimum disturbance or agitation of the liquid and at the same time the contents of the liquid in the tube is the same as that in the container. After the gauge has moved to the bottom of the container, movement of one section of the gauge relative to another section thereof closes the lower end of the tube whereby the tube and the liquid collected therein may be removed for subsequent inspection.

Apparatus embodying features of my invention is illustrated in the accompanying drawing, forming a part of this application, in which:

FIG. 1 is a perspective view, partly broken away, showing the lower end of the tubular member in engagement with the stopper;

FIG. 2 is a fragmental, sectional view showing the lower end of the tubular member in spaced relation to the stopper;

FIG. 3 is a fragmental, sectional view showing the lower end of the tubular member closed by the stopper with a quantity of liquid collected within the tubular member;

FIG. 4 is a sectional view taken generally along the line 4—4 of FIG. 2; and

FIG. 5 is a side elevational view, partly broken away, showing the sampler gauge inserted in a tank.

Referring now to the drawing for a better understanding of my invention, I show an elongated member 10 which may be formed of any suitable material, such as aluminum or the like. In the drawings, I show the elongated tubular member 10 as being generally rectangular, as viewed in cross section. An arcuate recess 11 is provided in one side of the elongated member 10 in position to receive with a sliding fit an elongated tube 12. The side of the elongated member 10 is cut away to provide a longitudinally extending slot 13 which exposes a longitudinally extending portion of the tube 12, as shown in FIGS. 1 and 4. Also, as shown in FIGS. 2, 3 and 4, the portion of the elongated member 10 adjacent the arcuate recess 11 is hollow to provide a vertically extending passageway 14.

Extending upwardly into the lower end of the passageway 14, as shown in FIGS. 2 and 3, is a detent 16 carried by a transverse member 17. While I show the vertical passageway 14 as extending the entire length of the elongated member 10, it will be apparent that a suitable recess could be provided in the lower end of the elongated member 10 for receiving the detent 16. Extending upwardly from the transverse member 17 in spaced relation to and generally parallel to the detent 16 is a stopper 18 which is adapted to move inwardly of the tube 12 upon movement of the tube to the lower position, as shown in FIG. 3. It will thus be seen that upon relative movement of the elongated member 10 and the tube 12 in opposite directions, the lower end of the tube 12 is opened and closed respectively.

The tube 12 is formed of a material which is adapted to transmit light. In actual practice, I have found that a translucent material is satisfactory in every respect. However, if a more careful inspection of the liquid collected in the tube is desired, the tube may be formed of a transparent material, such as glass. A ring or handle 19 is connected to the upper end of the tube 12 to facilitate movement of the tube relative to the elongated member 10 to thus move the tube selectively from the open position shown in FIG. 2 to the close position shown in FIG. 3.

Measurement indicia 21 is provided on at least one side of the elongated member 10 so as to indicate the level of the liquid collected in the tube 12. It would also be apparent that suitable indicia 22 may be applied to the tube 12 to indicate the liquid level.

In operation, the tube 12 is moved relative to the elongated member 10 to move the tube 12 to unseated position relative to the stopper 18, as shown in FIG. 2. The sampler gauge is then inserted into a container 23, such as a tank or the like, containing a liquid 24. As the tube 12 moves downwardly into the liquid 24, the liquid passes into the lower end of the tube to thus provide a column of liquid within the tube which not only is at the same level as that of the liquid 24 in container 23 but also contains the identical product. Accordingly, any liquids collected within the container 23 having different specific gravities would form different stratums of liquids within the container. Since the tube 12 moves downwardly through the liquid 24 without disturbing the same, the tube 12 would contain the same stratums of liquid as that found in the container 23. For example, where the sampler gauge is employed to sample fluids, such as gasoline in a container, any water which collects within the container would form a stratum adjacent the bottom of the container. Accordingly, upon movement of the tube 12 downwardly through the gasoline and the lower stratum of water, the exact level of the gasoline and water in the container 23 would be indicated by the indicia 21 or 22, as the case may be. Also, other changes in the various stratums of liquid in the container 23 would be indicated by the column of liquid collected in the tube 12.

Upon movement of the elongated member 10 and the tube 12 to the bottom of the container 23, as shown in FIG. 5, the member 10 and ring 19 are moved downwardly whereby the tube 12 moves to the closed position shown in FIG. 3. That is, upon downward movement of the tube 12 relative to the elongated member 10, the stopper 18 enters the lower end of the tube 12 to collect a column of the liquid 24 within the tube 12, as shown in FIG. 3. The elongated member 10 and the tube 12 are then removed from the container 23 whereby the column of liquid 24 collected in the tube 12 may be inspected to determine the liquid level in container 23 and to determine whether or not there has been any change in the product within the container, such as the collection of water or the like therein.

From the foregoing, it will be seen that I have devised an improved liquid sampler which removes a column of liquid from the container which is identical to the body of liquid in the container. Accordingly, any change in the appearance of the liquid in the container is also indicated by the column of liquid collected in the tube of my sampler gauge. Also, by providing a sampler gauge which opens and closes the lower end of the tube selectively by merely moving the tube relative to the elongated support member therefor, I greatly simplify the construction of the sampler gauge and at the same time permit the lower end of the tube to be closed at any desired position within the body of liquid being sampled whereby samples may be taken at selected elevations within the container. Furthermore, by providing an arcuate recess in the elongated member for slidably receiving the tube, together with the longitudinally extending slot which exposes a longitudinally extending portion of the tube, the entire column of liquid collected in the tube may be inspected.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:
1. In a sampler gauge for obtaining a sample from a body of liquid:
   (a) an elongated vertical member,
   (b) there being a longitudinally extending groove in said elongated member,
   (c) an elongated tube frictionally engaging said groove and disposed for longitudinal movement in said groove with the upper end of said elongated member being adjacent the upper end of said tube and with at least a portion of said tube being exposed and adapted to transmit light, said elongated tube being frictionally held in its adjusted position in said groove,
   (d) a stopper carried by the lower end of said elongated member in position to close the lower end of said tube adjacent thereto upon relative movement of said tube and said elongated member in one direction and disposed to open said lower end of the tube upon relative movement of said tube and said elongated member in the opposite direction so that upon relative movement in said opposite direction said lower end of the tube is open as said tube is inserted into said body of liquid and remains open until said tube and said elongated member are moved relative to each other in said one direction, and
   (e) indicia carried by the gauge in position to indicate the level of liquid within said tube as seen through said exposed portion.

2. A sampler gauge as defined in claim 1 in which the lower end of the elongated member carries a transverse member and said stopper is carried by said transverse member in position to extend inwardly of said tube and an upstanding detent is carried by said transverse member, said detent being spaced from and extending generally parallel to said stopper and there being a recess in the lower end of said elongated member for receiving said detent whereby said transverse member is connected to said elongated member.

References Cited
UNITED STATES PATENTS 2,580,711   1/1952   Weidinger   73—425.4
2,634,612   4/1953   Quist   73—425.4

LOUIS R. PRINCE, *Primary Examiner.*

J. W. ROSKOS, *Assistant Examiner.*